United States Patent [19]

Hestad et al.

[11] 3,748,396

[45] July 24, 1973

[54] DIRECT INWARD DIALING TRUNK CIRCUIT

[75] Inventors: Alfred M. Hestad, Chicago; Benjamin R. Marbury, Oak Lawn, both of Ill.; Hector O. Medina, Buenos Aires, Argentina; Donald L. Neel, Lombard, Ill.

[73] Assignee: International Telephone and Telegraph Corporation, New York, N.Y.

[22] Filed: Apr. 14, 1971

[21] Appl. No.: 133,909

[52] U.S. Cl.... 179/18 DA, 179/18 AD, 179/18 AH, 179/18 BD

[51] Int. Cl. .......... H04m 3/38

[58] Field of Search.......... 179/18 B, 18 BD, 179/18 DA, 18 D, 18 AD, 18 AH, 18 AG, 18 ES, 18 E, 18 EA, 18 GF, 27 FG, 27 CB, 27 DA, 27 FH, 27 G, 27 CA

[56] References Cited

UNITED STATES PATENTS

| | | | |
|---|---|---|---|
| 3,221,108 | 11/1965 | Seemann et al. | 179/27 CA |
| 3,201,523 | 8/1965 | Blashfield | 179/27 CB |
| 3,448,221 | 6/1969 | Svala | 179/18 DA |
| 3,324,248 | 6/1967 | Seemann et al. | 179/18 E |
| 3,268,667 | 8/1966 | Arseneau | 179/18 GF |
| 3,391,252 | 7/1968 | Germanton | 179/18 AH |
| 2,725,427 | 11/1955 | Murray | 179/18 EA |
| 3,432,621 | 3/1969 | Bininda et al. | 179/18 EA |
| 3,496,303 | 2/1970 | Pharis | 179/18 AH |
| 3,306,983 | 2/1967 | Goodwin et al. | 179/18 BD |

*Primary Examiner*—Thomas W. Brown
*Attorney*—James B. Raden et al.

[57] ABSTRACT

An electronic switching telephone system is connected to an electromechanical system via a plurality of trunk lines. At the electronic system end, each trunk line terminates in a direct inward dialing (DID) trunk circuit, which may take various forms, depending upon the mode of signaling used. In addition, a subscriber who either receives or makes a trunk call may hold the trunk call and locally call a second subscriber for a conference or transfer the trunk call to a second subscriber. Toll calls may be restricted to certain subscriber lines, with means for precluding a fraudulent defeat of the restrictor means. A particularly useful feature of the DID trunk circuit is its ability to direct an originated call into either side of the network. This way, the trunk circuit may operate more efficiently than it would operate if all calls had to originate on one side of the network.

16 Claims, 12 Drawing Figures

INVENTORS
ALFRED M. HESTAD
BENJAMIN R. MARBURY
HECTOR O. MEDINA
DONALD L. NEEL
BY
Alter, Weiss & Whitesel
ATTORNEYS

PATENTED JUL 24 1973

3,748,396

SHEET 2 OF 6

DIRECT INWARD DIALING TRUNK CIRCUIT 24

DIRECT INWARD DIALING TRUNK CIRCUIT

This invention relates to electronic switching telephone systems using current controlled networks, and more particularly to private branch exchanges which may be driven responsive to dial signals received from a distant office.

Generally, electronic switching networks include a plurality of electronic crosspoints interconnected to provide many alternative paths from any network inlet to any network outlet. One particular type of this kind of network is sometimes called a current controlled, self-seeking network, the details of which are shown in a U.S. Pat. No. 3,204,044 entitled "Electronic Switching Telephone System" granted Aug. 31, 1965, to Virgle E. Porter, and in a number of other patents, all of which are assigned to the assignee of this invention.

Briefly, a "self-seeking" network has the ability, within the network itself, of selecting a particular one of the many alternative paths between any two end-marked points. Stated another way, no in-network controls are necessarily required to complete a switch path between any selected inlet and outlet. A "current controlled" network depends upon the continuity of current over a completed path in order to hold the connection. An absence of such current releases all crosspoints in a path through the network.

These current-controlled, self-seeking networks are generally interposed between subscriber lines and switch path controlling links or junctors — the terms "links" and "junctors" have been used interchangeably. The principle is that one of many junctors is assigned to serve the next call. Then a first path finds its way from a calling line through the network to the assigned junctor, and thereafter another path is extended from a called line to the same assigned junctor. Next, the junctor joins the two paths and a conversation may follow.

In addition, electronic and electromechanical types of systems generally require interface connections (such as transformers) with complete D.C. isolation between them. Among other things, electronic devices would not function properly if there are any small changes in currents or potentials, whereas these same changes do not normally affect electromechanical devices. Also, D.C. isolation always is desirable between any two systems because the two systems "grounds" may have different potentials.

A private branch exchange (PBX) provides an example of where the two types (electronic and electromechanical) of systems must work together. More particularly, a private branch exchange is a small switching system which is usually located on a subscriber's premises and connected via trunk lines to a public utility type of central office. Therefore, the PBX must contain adapter circuits for making the two systems compatible. Usually these adapters are connected to the incoming ends of the trunk line, and they are generally called "trunk circuits."

Among other things, a newer style PBX usually provides means whereby a calling subscriber in one office may send dial or other signals directly into the other office for controlling its switching facilities. This capability is generally called "Direct Inward Dialing" (DID).

Accordingly, an object of the invention is to provide new and improved electronic switching telephone systems, and especially private branch exchanges. A more particular object is to provide electronic switching systems having direct inward dialing capabilities. Here an object is to accomplish such direct inward dialing without sacrificing any of the potentialities of current controlled, self-seeking networks.

A further object of the invention is to provide trunk circuits for interconnecting electronic and electromechanical switching systems. In this connection, an object is to provide electronic switching trunk circuits which are compatible with electromechanical systems. Moreover, an object is to provide all supervisory functions normally required by both the electronic and electromechanical systems.

In accordance with an aspect of the invention, an electronic system is connected to an electromechanical system via a plurality of trunk lines. At the electronic system end, each trunk line terminates in a trunk circuit which may take various forms, depending upon the mode of signaling used. For example, the following description is directed to loop signaling; however, any other conventional form of signaling may be used, such as E&M type signaling, or the like. In addition, a subscriber who receives or makes a trunk call may hold the trunk call and locally call a second subscriber for a conference; or, he may transfer the trunk call to a second subscriber station. Toll calls may be restricted to certain calling subscriber lines. A particularly useful feature of the trunk circuit is its ability to direct an originated call into either side of the network. This way, the trunk circuit may operate more efficiently than it would operate if all calls had to originate on one side of the network. Still another feature of the trunk circuit resides in its ability to examine calls which appear to be in progress when power is first applied to the system, either when the system is originally turned on, or when power returns after a momentary interruption. If the call appears to be a valid one, it is allowed to continue. If not, it is cancelled, and the equipment is forced to reset.

The above-mentioned and other features and objects of this invention and the manner of obtaining them will become more apparent, and the invention itself will be best understood by reference to the following description of an embodiment of the invention taken in conjunction with the accompanying drawings, in which.

GENERAL DESCRIPTION

Figure 1:
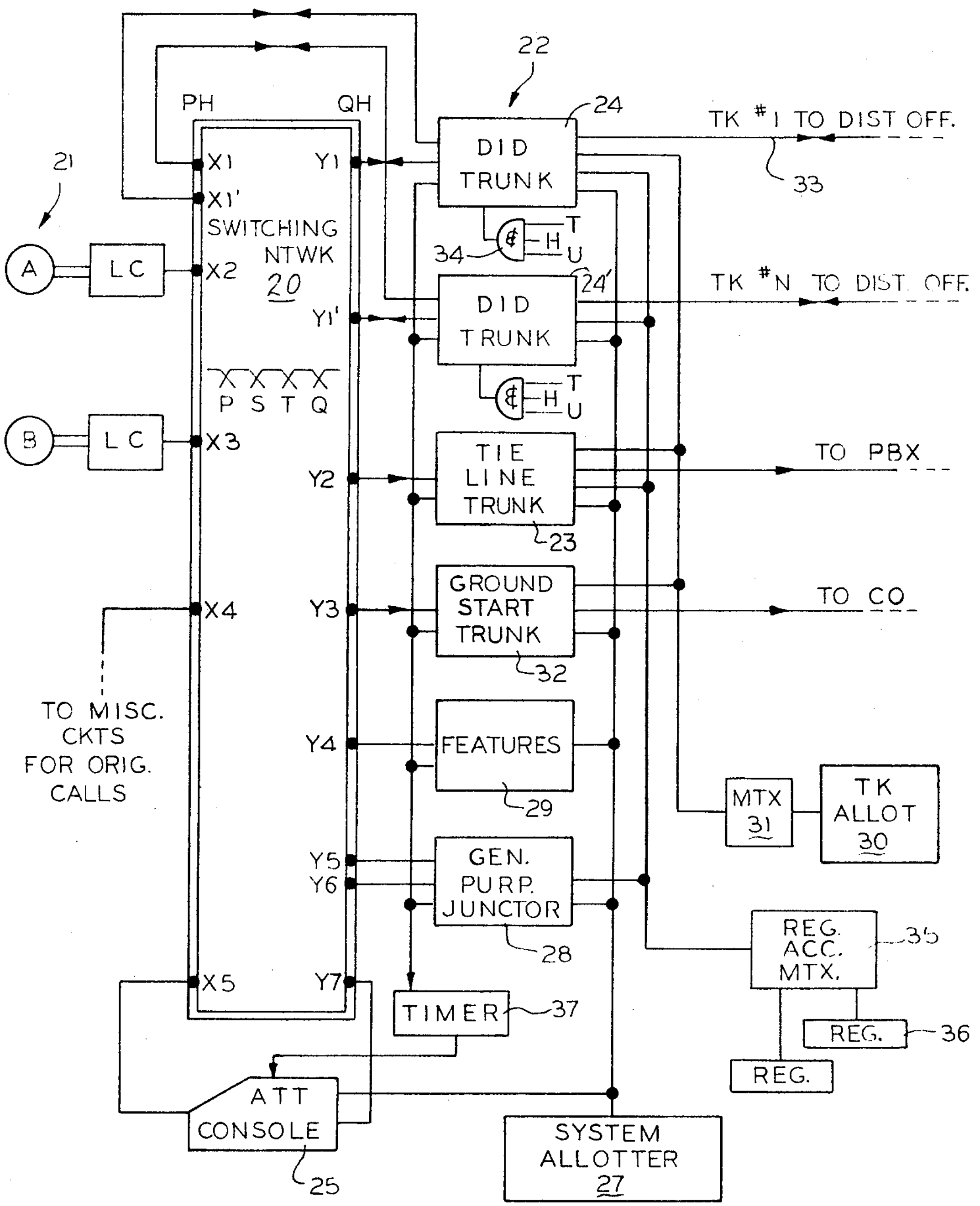
FIG. 1 is a block diagram showing the principles of an electronic telephone system constructed in accordance with the teachings of this invention.

FIG. 1 shows an exemplary telephone system utilizing a current controlled, self-seeking network 20 of the type shown in the above-identified Porter patent. The switching network 20 (FIG. 1) completes all paths from input terminals on the left to output terminals on the right, as viewed in FIG. 1. In one exemplary system, these paths extend through four cascaded stages designated "primary" (P), "secondary" (S), "tertiary" (T), and "quaternary" (Q). Since the input and output connections are made to and taken from the horizontals of switching matrices, the input is designated "PH" (primary horizontal) and the output is designated "QH" (quaternary horizontal).

Subscriber line circuits 21 are connected to the input terminals or inlets on the primary side (PH) of the network 20 at access points "X," and common controlling circuits 22 are connected to the output terminals or outlets on the quaternary side (QH) at access points "Y." The point X4 generally indicates any and all other equipment having access to the line side of the network.

A plurality of trunk circuits are provided for interconnecting both input and output terminals on said network with electromechanical switching systems via trunk lines individually associated with said trunk circuits. More particularly, two-way trunk lines 33, to a distant central office, terminate in direct inward dialing (DID) trunk circuits 24 at the electronic office. The trunk circuit is connected to the switching network 20 at both the inlet or line circuit side and the outlet or junctor circuit side. This way the DID trunk circuit 24 may behave as either a subscriber line or a control circuit, depending upon whether a call is incoming or outgoing. Also, the direction arrows on the wires connected to points X1 and Y1 indicate that, from a logic viewpoint, there is a two-way access to the network. An attendant controlled position or console 25 is connected to the access points X5, Y7.

Each of the circuits 22 and attendant console 25 are allotted in sequence by individually associated time slot signals, produced by a free running marker or system allotter 27. Thus, the junctor, trunk, and attendant circuits have access to the network one-at-a-time on a time sharing basis. Common equipment (not drawn in FIG. 1) also provides dial tone, busy tone, ringing tone, and other similar signals.

The switching network 20 includes a plurality of cascaded matrices; here symbolically shown as primary (P), secondary (S), tertiary (T), and quaternary (Q) matrices. Each matrix comprises intersecting horizontal and vertical multiples which provide connections for cross points such as PNPN diodes, which have a current controlled switch "off" capability. This allows switch paths to find their ways between two end-marked points in the network. Thus, end-markings at points X2 and Y5, for example, cause a self-seeking switch path to find its way from line A, through the network, to general purpose junctor 28. In a similar manner, end-markings at points X3, Y6, for example, might cause another path to find its way from line B through the network to the general purpose junctor 28. If junctor 28 now joins the points Y5, Y6, subscriber lines A, B are connected together in a conversation path.

Each subscriber line terminates in a line circuit LC which recognizes a request for a switch path condition and applies an end-marking potential to the line side of the network 20 (e.g., point X2), if the line circuit is not then busy. Insofar as the network 20 is concerned, this end-marking produces the same effect regardless of whether it indicates a calling, a called, or a transfer condition.

The control and junctor circuits 22 are divided into two groups. A first group (exemplified by junctor 28) has general purpose capabilities and can control the extension of conventional calls through the network 20. A second or features group (exemplified by control circuit 29) has special purpose capabilities and can control specific call features, such as: executive-right-of-way, conversation timing, camp-on-busy, and the like. Under various conditions trunk circuits 24 may be treated as a line circuit, general purpose junctor, or features circuits.

Each control or junctor circuit is allotted to establish a connection through the network on a call function basis. That is, the allotter 27 is a free running device which produces cyclically recurring time frames (defined by electrical pulses). Each pulse enables a related control circuit to complete a call function.

The trunk allotter 30 may include a chain of circuits which preselect a trunk to serve the next outgoing call, as disclosed in U.S. Pat. No. 3,655,918 entitled "Trunk Allotter," filed Apr. 17, 1970, and issued Apr. 11, 1972 to Benjamin R. Marbury, Alfred M. Hestad, and Jose Reines, and assigned to the assignee of this invention. The allotter acts through a matrix 31 to preselect one of the direct inward dialing trunks 24 to serve the next call.

In addition to inward dialing trunks, conventional outgoing trunk circuits 32 or tie line circuits 23 may also be normally reserved for certain types of calls. These reserved trunks, tie lines, and the like, may also be assigned by the same trunk allotter 30. During periods of high traffic density, they may also be used to relieve the burden of the general purpose inward dialing trunks.

The general principle of the invention is that an incoming call from an electromechanical office is received over a trunk line, such as 33, for example, connected to a particular DID trunk circuit 24. During an allotter period assigned to that particular trunk circuit, the AND gate 34 conducts. Then, the selected trunk circuit 24 causes a by-pass swiching matrix 35 to seize an available register 36 which returns dial tone, and stores incoming digits, as they are received. These registers then control the electronic system in a conventional manner to complete the local connection.

The bell in a called subscriber station is rung to indicate the occurrence of the call. Simultaneously, a timer 37 measures a period of time. If the called subscriber does not answer before the timer times out, an attendant position or console 25 is called in to give personal attention to the call.

DETAILED DESCRIPTION

The direct inward dialing trunk circuits 24, 24' have an important characteristic not heretofore available in systems of this type. More particularly, the access points Y1 and Y1' are on the output side QH of the switching network 20 which always terminates switch paths that originate at the access points on the input side PH. Thus, the Y points have heretofore been used only as the functionally terminating points of access for system calls (e.g., calls where always extended from the lines 21 to the control circuits 22, even when the connection was being extended from the control circuit to the called line). Now, however, the circuits 24, 24' have the functional ability to also act as an originating circuit. Thus, it has now become possible to logically extend the call from the control circuit 24 at a QH point to a line or other circuit appearance on the primary (PH) side of the network (i.e., from the viewpoint of system logic, the calls extend from the quartenary side QH to the primary side PH.).

The FIGS. 2–7 are block diagram fragments taken from FIG. 1 to illustrate important events occurring during the sequence of setting up various types of calls. The same reference characters identify the same circuits in each of the FIGS. 1–7.

Figures 2, 3, 4, 5, 6, 7:
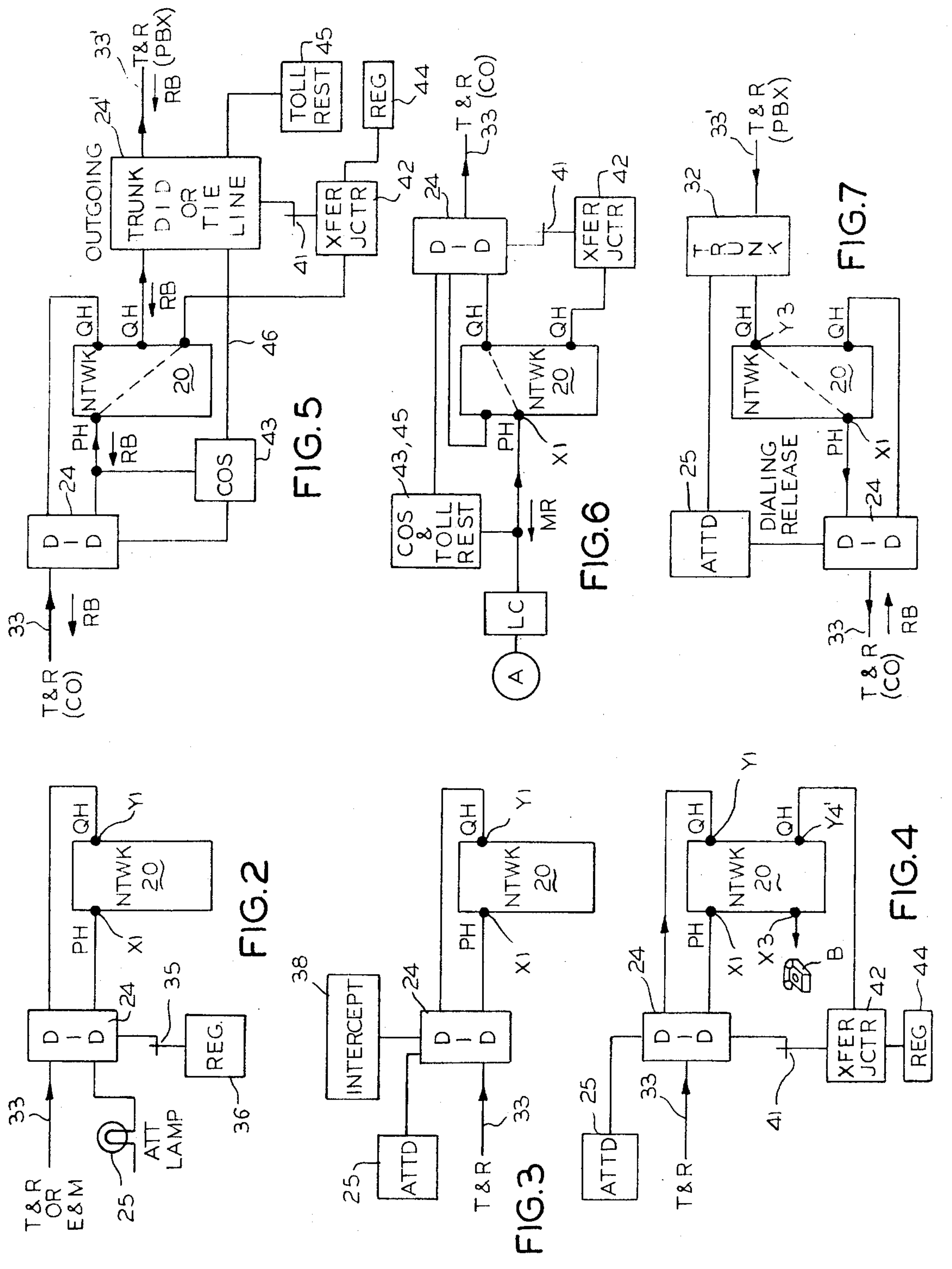
FIGS. 2–7 are fragmentary block diagrams taken from the FIG. 1 block diagram and showing how various calls are processed.
Figure 8:
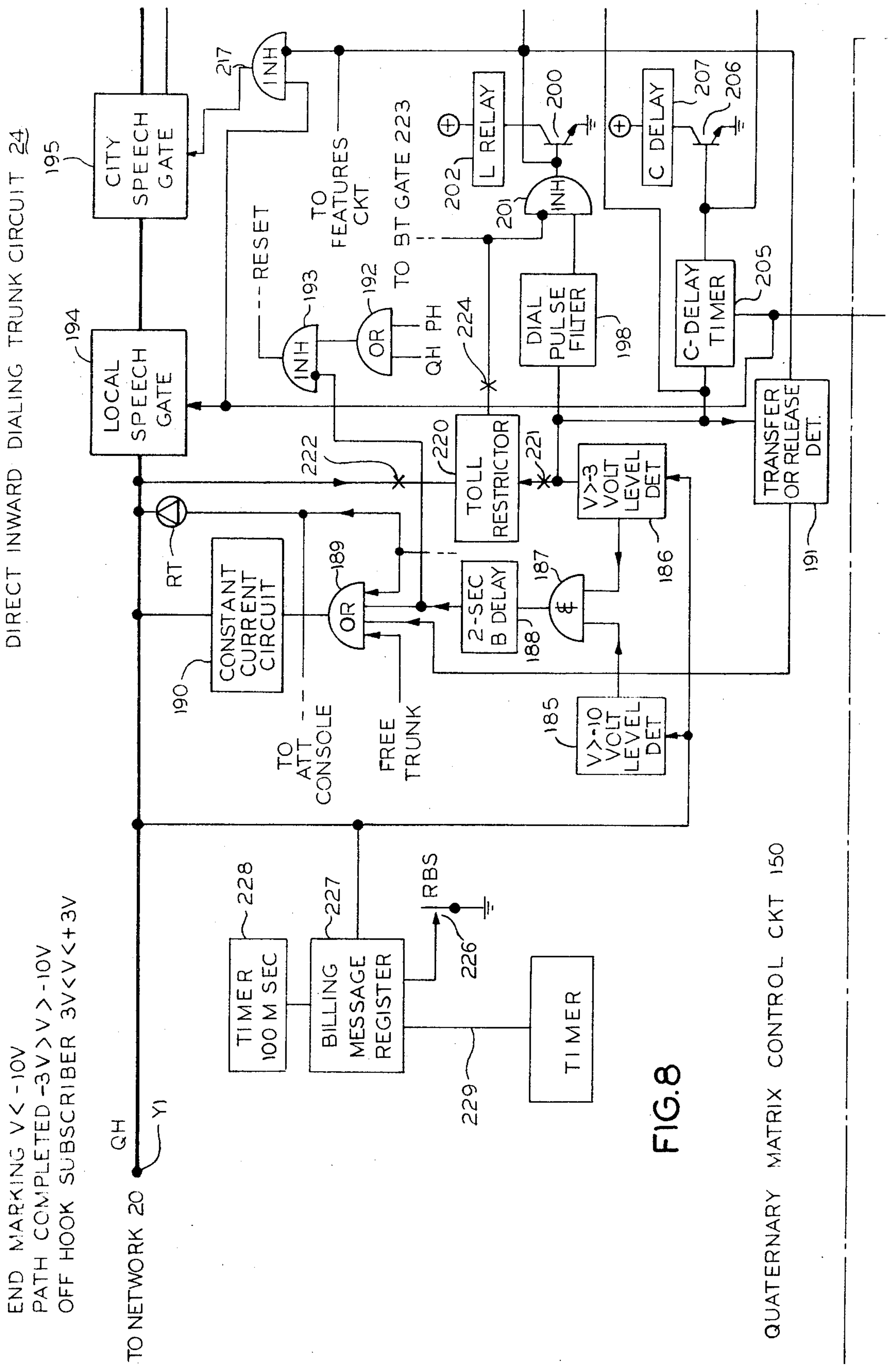
FIGS. 8–11 are a schematic block and logic diagram showing how the DID trunk circuit is constructed.

In greater detail, FIG. 2 shows the conditions occurring responsive to seizure of a trunk circuit from a distant office. More particularly, a call comes in on trunk line 33 using any known kind of signaling, such as loop or E and M signaling, for example. The trunk line 33 is connected to a direct inward dialing trunk circuit 24 which may respond by lighting a lamp at the attendants console 25 or by connecting a register for direct inward dialing control. The register access bypass switching matrix 35 operates to connect a register 36 directly through the trunk circuit 24 to the trunk line 33. While the trunk circuit 24 is here shown as being connected to access points X1, Y1 on the network 20, no application has yet been made to the system logic for a switch path through such network. Until the register 36 is ready to receive dial pulses, a reverse battery stop dial signal may be returned over trunk 33 to the distant office.

As soon as the register 36 is ready to receive dial pulses from the distant office, it returns dial tone, if the system is so equipped. Also the direct inward dial trunk circuit 24 cancels the reverse battery stop dial signal by returning the battery supply to its normal polarity.

Responsive thereto, the calling subscriber in the distant office may forward dial signals over trunk line 33, in any conventional and suitable manner. For example, the calling subscriber may send either multi-frequency tone signals or rotary dial pulses to the register 36. The next function depends upon the nature of the digits that are received.

If there is any reason why the call cannot be completed (FIG. 3), the system goes into an intercept mode of operation. More particularly, the DID trunk circuit 24 makes a direct voice path connection from the trunk line 33 to the attendant's console 25 for call such as those to unequipped numbers, vacant levels, or the like. Alternatively, a connection may be made through an intercept circuit 38, if there is a need for the playback of a recording. Any suitable recording may be played back via circuit 38 according to the users needs. This type of call is seen in FIG. 3 where the attendant console 25 or an intercept circuit 38 is connected directly to the DID trunk circuit 24. The trunk circuit 24 still has not made application for a path through the network 20.

The system may complete a call through the network 20 responsive either to an attendant's control or to the digits stored in the register. In any event, as shown in FIG. 4, the DID trunk circuit 24 completes a path from point X3 through the network 20 to a point Y1, and thus to a called telephone station B. The phone is rung in any suitable manner. When the called party answers, a reverse battery answer supervision is returned over the trunk line 33 to the distant office.

For transfer, the subscriber operates a hook switch momentarily (e.g., about 10 seconds). For example, the called subscriber might discover that the call is better directed to some other subscriber; or, perhaps another subscriber is required for a conference or a consultation call. In any event, the subscriber at station B momentarily flashes a hook switch signal which persists longer than a dial pulse, but shorter than an on-hook signal.

Responsive to the hook switch flash, the DID trunk circuit 24 operates an access or bypass matrix 41 which connects a transfer junctor 42 thereto. The transfer junctor is one of the features circuit 29 (FIG. 1) which may supplant the general pupose link during a call. In any event, the subscriber B may control the transfer junctor 42 by sending dial pulses through the DID trunk circuit 24 and the bypass 41 to the register 44. These pulses are stored in a register 44 permanently associated with the transfer junctor. Responsive thereto, the network completes a new path from a second called subscriber line (not shown) to the matrix point Y4'. The subscriber may converse; or, the party B may hang up and leave the second called subscriber in control of the connection.

A class of service circuit 43 may or may not enable the trunk circuits 24 and 24' to place a unique type call which is authorized to only certain lines. More particularly, the calling party in a distant office is connected to the DID trunk circuit 24 via line 33. That subscriber dials the digits of a wanted directory number, and a toll registrictor 45 monitors the dial pulse for at least a given digit. The wire 46 provides a command path by which the toll restrictor is informed as to the class of service to be accorded to the DID trunk circuit 24. For example, the second digit of all area codes is either a "1" or an "0." If the restrictor 45 is monitoring this second digit, it could either enable or restrict a call depending upon whether it is local or an area call and further depending upon whether the class of service circuit 43 indicates an authorization for the completion of an out of area call. While the call is progressing, a distant office may return a stop dial signal in the form of reverse battery supervision extended over trunk line 33'. If so, the system repeats this stop dial signal to the trunk line 33, as indicated by the arrow RB (reverse battery) in FIG. 5.

If the subscriber who is connected to trunk 33 wishes to summons another subscriber or an attendant in the local exchange (i.e., via the network 20), he operates a hook switch momentarily. This hook switch flash operates the bypass matrix 41 to bring in the transfer junctor 42 in the same manner as the hook switch flash brings in the transfer junctor, as described in connection with FIG. 4. The subscriber hears dial tone from the register 44, and then he dials into that register. Responsive thereto, any circuit connected to the primary side (PH) of the network 20 is connected to the calling party via the trunk line 33. The transfer junctor 42 may be arranged so that the party on the trunk line 33' cannot hear the conversation between the party or trunk 33 and the other party (not shown) who is newly connected into the call via the transfer junctor 42. However, if the party on trunk 33 thereafter operates his hook switch a second time, the transfer junctor 42 operates a voice gate which completes a voice path between the party who is connected via the transfer junctor and the party who is connected via the trunk line 33.

If the party served by the trunk line 33 hangs up, the other party, who is connected via the transfer junctor 42, is connected through the network 20 directly to the trunk line 33', and the transfer junctor 42 releases.

Means are provided for precluding a fradulent defeat of the toll restrictor 45. More particularly, the circuit is arranged at the user's option to release when either or both parties hang up. This presents a problem of possible fraud. More particularly, during the dialing period after a call is first placed, the class of service circuit 43 and toll restrictor 45 are connected to monitor the various digits of the called number as they are being dialed. The restrictor 45 bars the use of the system responsive to certain unauthorized numbers. Moreover, the transfer junctor 42 is seized responsive to hook switch flashes. Therefore, the system cannot be allowed to release immediately responsive to on-hook conditions. Accordingly, there are times when the party controlling trunk line 33 is connected to the system, and the party controlling trunk line 33' is not so connected. For example, the party on trunk line 33' could hang up, and the party on trunk line 33 could hold the connection. Thus, if uncontrolled, an unanswered calling condition would appear on the distant end of the trunk line 33', and finder equipment thereat would be connected to serve the call.

However, this appearance of un unanswered calling condition cannot be allowed to occur at this time since the class of service circuit 43 and toll restrictor 45 were dismissed from the connection after their function was completed, when the original call was initially set up. If the calling party is allowed to dial again after the initial call has been released, the toll restrictor is not present to monitor the digits being dialed. Thus, there would be an invitation to fraud. For example, a calling party might dial an allowed code, talk briefly to a called party, wait a moment after the called party hangs up, and then place another and unauthorized call, with no restrictor equipment present to monitor the outgoing digits.

To enable a transfer of calls and yet preclude the possibility of such fraud, the DID trunk circuit 24 is adapted to immediately reseize the distant office each time that there is a release condition. This reseizure signal holds the distant office via the trunk line 33' throughout the duration of a measured time period. This measured period is longer than the period generally required to complete a transfer connection. Therefore, this reseizure condition persists long enough to insure proper operation of the transfer junctor 42 on a transfer. During the entire period of such reseizure, the various voice gates are disabled in the DID circuit so that multifrequency tones cannot be passed to the distant office. Also, the dialing relays are locked up to preclude such transmission of dial pulses. This way, it is not possible to control any switching equipment at the distant office.

At the end of a measured period of time, the automatic reseizure condition terminates. If the release condition continues after the reseizure period ends, it means that there was an actual release, as distinguished from a transfer hook switch flash. Thus, the system releases immediately and before a new call can be placed. If there is a transfer condition when the reseizure terminates, the system takes any action which is appropriate.

Each of the call conditions described above, in connection with FIGS. 2–5, involves an inward call received at the inventive electronic exchange via the trunk line 33. The calls described below, in connection with FIGS. 6 and 7, relate to an outgoing call which originated in the inventive electronic exchange.

In greater detail, a call is initiated when subscriber A (FIG. 6) removes a hand set and dials a number, as described above. Responsive to a predetermined access code, the network 20 seizes one of the DID trunk circuits 24 (according to a preallottment) and therefore trunk line 33 to a distant office. As soon as the trunk call is detected, the class of service circuit 43 and toll restrictor circuits 45 are connected to monitor any outgoing digits. When an answer occurs in the distant office, a suitable message register is tripped or a toll ticket is made locally.

Some distant offices are adapted to open the loops of each incoming call for a period of 300-milliseconds to test the trunk line for its transmission characteristics. If the line does not meet certain minimum requirements, the call is switched to a different line. Therefore, the DID trunk 24 is arranged to reject all release signals received from the distant office during a period of 350-milliseconds, thus precluding a release of equipment during the period of testing.

The calling party may also flash his hook switch to summons a transfer junctor 42 which enables him to dial a local number and reach a called subscriber B while an earlier call is in progress. If desired, the DID trunk circuit 24 may be arranged to prevent a complete transfer of this outgoing call with a subsequent release of the calling party, since this type of call is very often prohibited by local tariff regulations. Accordingly, the DID trunk circuit 24 is generally released when the calling party A hangs up.

The final call to be described here (FIG. 7) involves an outward call placed from an attendant position connected to the end of a PBX trunk line which is part of a local trunk circuit 32. Here, the attendant dials a three digit code, from the PBX, which identifies a need for a DID trunk line leading to a distant office. Responsive thereto, the local office extends a call from trunk circuit 32 to the quaternary side (QH) of the network (access point Y3) to the primary side X1 of a DID trunk circuit 24, which is pre-assigned by a trunk allotter. If the circuit 24 is so pre-assigned, the trunk circuit access point X1 is seized via the path through network 20.

The network 20 still responds to end markings in the conventional manner. However, it should be noted that functionally the call came in (at Y3) on the quaternary side of network 20 and went out (at X1) on the primary side of the network. Heretofore, the trunk circuit 32 would have required original access to the primary side PH of the network 20. Under some conditions, it may be necessary to call in the local attendant position 25. If so, this is done by dialing the number of the attendant console 25 from the PBX. The circuit is usually equipped to release the call responsive to a control signal from the PBX.

Figure 12:
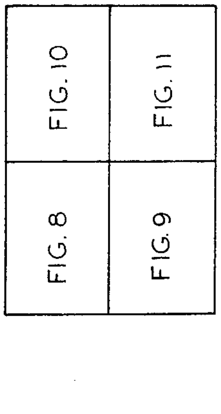
FIG. 12 shows how the FIGS. 8–11 should be assembled to illustrate the two-way electronic trunk circuit.

When joined, as shown in FIG. 12, the logic diagram of FIGS. 8-11 shows the pertinent parts of the direct inward dial (DID) circuit 24 or 24' of FIG. 1, together with certain peripheral circuits required for an understanding thereof. In this composite figure, dot-dashed lines are used to separate the major functional circuit areas, as follows: a quaternary matrix control circuit 150, common control equipment 151, register access circuit 152, primary matrix control circuit 153, and outgoing access points or voice circuits 154. Any one of these access points 154 may be selected by an operation of the contacts 155, in any well known manner (not shown). Some parts of this composite logic circuit are also shown in two co-pending applications entitled "Tie Line" and "Trunk Allotter," Ser. Nos. 28,883 and 29,600, respectively, filed Apr. 15, 1970 and Apr. 17, 1970, respectively, and assigned to the assignee of this invention.

The speech path through the trunk circuit 24 is shown by a heavily inked line. This path makes connections with the switching network on both the primary side PH (FIG. 10) as at the access point X1, for example, and on the quaternary side QH (FIG. 8), as at the access point Y1, for example. Normally, the primary matrix control circuit 153 closes transfer means in the form of contacts 160 to prepare the circuit to respond to the receipt of a call at the quaternary horizontal (QH) access point Y1. This call may be destined for any well known trunk equipment, leading to a distant office, such as an E and M signaling trunk circuit, an "interconnect circuit" (i.e., a foreign attachment connected to a telephone line), or a loop signaling trunk. Still other types of outlets could also be shown.

The trunk circuit 24 comprises two-way means for interconnecting said electronic system and electromechanical switching equipment via a trunk line. In greater detail, for an incoming call, the primary matrix control circuit 153 closes the transfer means contacts 163, and the outgoing voice path is connected from line circuit type equipment 165 (which is part of the DID trunk circuit 24) to the appropriate trunk line equipment 154. Thus, calls may be extended from any of the access points 154 to the primary network inlet X1. From there, the call may be further extended in a normal manner responsive to the dialing of a directory number which completes a path through the network 20. In addition, the DID trunk circuit also has the unique ability to complete an incoming call from an access point 154 to the QH point Y1. A call which is incoming from a distant office is completed during a time slot identified by a simultaneous occurrence of a particular hundreds, tens, and units marking at the gate 34 (FIGS. 1 & 11), which identifies the time appearance of the trunk circuit. Also, the incoming call requires a feature mark pulse FM and a register terminate pulse RTP at the gate 300. The FM pulse indicates when an incoming (or other special feature) call may be completed.

With these general comments in mind, the direct inward dialing trunk circuit (FIGS. 8-11) will be understood best from a detailed description of how various calls are completed to or from the access points 154. For this, the assumption is that the loop signaling trunk is used, but this is not critical.

OUTGOING CALL

An outgoing call (FIG. 6) is one from a local subscriber, such as A or B (FIG. 1) to a distant office via the DID trunk circuit 24 and trunk line 33. Insofar as the DID trunk circuits (FIGS. 8-11) are concerned, such a call is indicated by a call which first appears on a quaternary horizontal QH, as at point Y1, for example. The source of the call is not important. It may originate with any circuit which can complete a path through the network 20.

Prior to the receipt of the call, a trunk allotter (such as described in the above-identified co-pending application Ser. No. 29,600) pre-selects an idle trunk circuit 24 to serve the next call. This pre-selection is made by marking an AND gate 170 (upper right of FIG. 9) via lead 171 and a quaternary identification lead 172 (somewhat similar to a level marking in an electromechanical system).

Responsive to the output of the AND gate 170, a latch circuit 173 is operated to pre-select this particular trunk. Among other things, latch circuit 173 causes the circuit of FIGS. 8-11 to prepare itself to serve the next inward dialing trunk circuit call by energizing an enable lead 174. In addition, the latch circuit 173 feeds back a signal via an OR gate 175 and a busy allot circuit 176. A holding ground is sent to a latch locking point 177 and an attendant position or console 25 to advise the attendant of the busy condition. For the duration of the call, the allotter is prevented from again pre-allotting this trunk circuit, and the enabling signal is held on lead 174 by the latch circuit 173. In addition, a busy light (not shown) lights to give a visual trunk circuit busy signal.

The trunk circuit 24 is standing ready to receive the next DID call. Therefore, the trunk circuit applies an end marking (FIG. 8) to point Y1 during each DID feature mark period in the output of the system allotter 27 (FIG. 1).

Using the terminology that "less than" (<) means "more negative" than and "more than" (>) means "more positive than," the drawing has been labeled to indicate the meaning of voltage (V) changes at the quaternary horizontal access point Y1. Thus, if the voltage V at the point Y1 is more negative than −10 volts, an end marking is being applied to the point Y1, responsive to a signal on wire 174 (recall that this signal depends upon a quaternary mark at 172 and a trunk preselection mark at 171 of the AND gate 170). When a path is completed through network 20 to the point Y1, the voltage V is between −3 volts and −10 volts. After a subscriber answers, the voltage V is between −3 and +3 volts. For convenience of expression, the end marking may be called −10 volts, the completed path may be called −3 volts, and the off-hook condition may be called +3 volts.

Logically, the trunk circuit (FIGS. 8-11) interprets the status of the path by a selective operation of two voltage level detectors 185, 186. When any voltage which is greater (more positive) than −10 volts appear at the point Y1, the −10 volt detector 185 gives an output signal. When a path is completed on any voltage which is greater (more positive) than −3 volts appears at the point Y1, the detector 186 also gives an output signal. Stated another way, the detector 185 gives an output signal when the path is completed and the detector 186 dives an output signal when a connected subscriber station is off-hook.

If a primary (PH) end-marking appears (such as at a calling line end, point X2, FIG. 1, for example), at the same time that a trunk level mark appears at 172 and an allotter pre-selection mark appears at 171, a path fires through the network 20 to the point Y1. The detector 185 then gives an output signal. If the connected station is also in an off-hook condition, the detector 186 also gives an output signal. The AND gate 187 conducts to send a signal through a two-second "B-delay" circuit 188 and an OR gate 189 to a source of constant holding current 190. The "B-delay" circuit 188 comes on at once, but it requires two seconds to turn off. Thus, it provides a release delay during which the trunk circuit 24 is held in an "on" condition, as during dial pulsing, for example. If the "on-hook" condition persists beyond two seconds, the trunk circuit is prepared to release. However, the transfer detector 191 continues to hold the path for about ten seconds, which is long enough to detect a hook-switch flash given for the purpose of transferring a connection. The output current of the constant current circuit 190 holds the path through the network 20.

Automatic power reset means are provided for detecting and distinguishing between true call conditions and power applications or power interruptions on the network path, which simulate call conditions. More particularly, in the normal state, the "B-delay" circuit 188 is turned off. Thereafter, this delay circuit turns on when a network path appears, and it requires two seconds to turn off after the network path disappears. Therefore, the condition of timer 188 enables a distinction to be made as to whether there is either a current interruption on the network path or a path is really required when power is either applied or reapplied to the system.

This automatic power reset is accomplished by the two gates 192, 193 which are controlled by voltage changes at the network access points or appearances PH and QH and by the B-delay timer, respectively. When a normal call first appears, the timing in the system logic is such that the "B-delay" circuit 188 gives an output before a change of voltage at the network access points PH or QH can reach the input of the OR gate 192, and it can give an output signal. Thus, during normal calls, the signal from "B-delay" circuit 188 inhibits gate 193 so that the output from the OR gate 192 can have no effect upon the circuit when the voltage change at network access points PH or QH appears at the input of gate 192.

If, during a call, there is an interruption of current upon the path through the network 20, and the interruption is not long enough to allow timer 188 to time out, gate 193 remains inhibited, and there is no effect upon the system. When the interrupted signal reappears at the QH or PH access points, the OR gate 192 can have no effect because gate 193 is already inhibited by the "B-delay" circuit. On the other hand, if the interruption is longer than two seconds, but not long enough for the entire system to reset, the signal change appears at either of the PH or the QH inputs to the gate 192, after the "B-delay" circuit 188 has timed out and before it recycles and turns on again responsive to any new signal. Thus, the output of OR gate 192 applies a signal through the gate 193 to a reset bus and drives the entire trunk circuit 24 through its reset cycle. Then normal dial tone is returned to the calling subscriber. Thus, the call is held if there was a true call condition which was not interrupted long enough to indicate a reset cycle. Or, if a reset cycle is initiated, but not completed, the call is held until a reset cycle is completed. If there was only an invalid simulation of a call, the reset will clear it before the direct inward dialing circuit is enabled to complete a call.

In summary, the timing delay circuit 188 forms a means for delaying the release of the trunk circuit for a period which is long enough for all normal signalling to occur without causing a release. The gates 192, 193 provide monitoring means responsive to the condition of the timing delay means 188 when power appears. The monitor gates release the apparently newly initiated call, if the period for the delayed release has expired.

It may be recalled from the description of FIG. 1 that all locals calls begin with a connection to a general purpose junctor 28. Then, the person placing a call dials the directory numbers which identify the destination of the call, which is then recognized as a trunk call. Also, the station placing the call has an unrestricted marking (i.e., it is authorized to place a trunk call).

Figure 9:
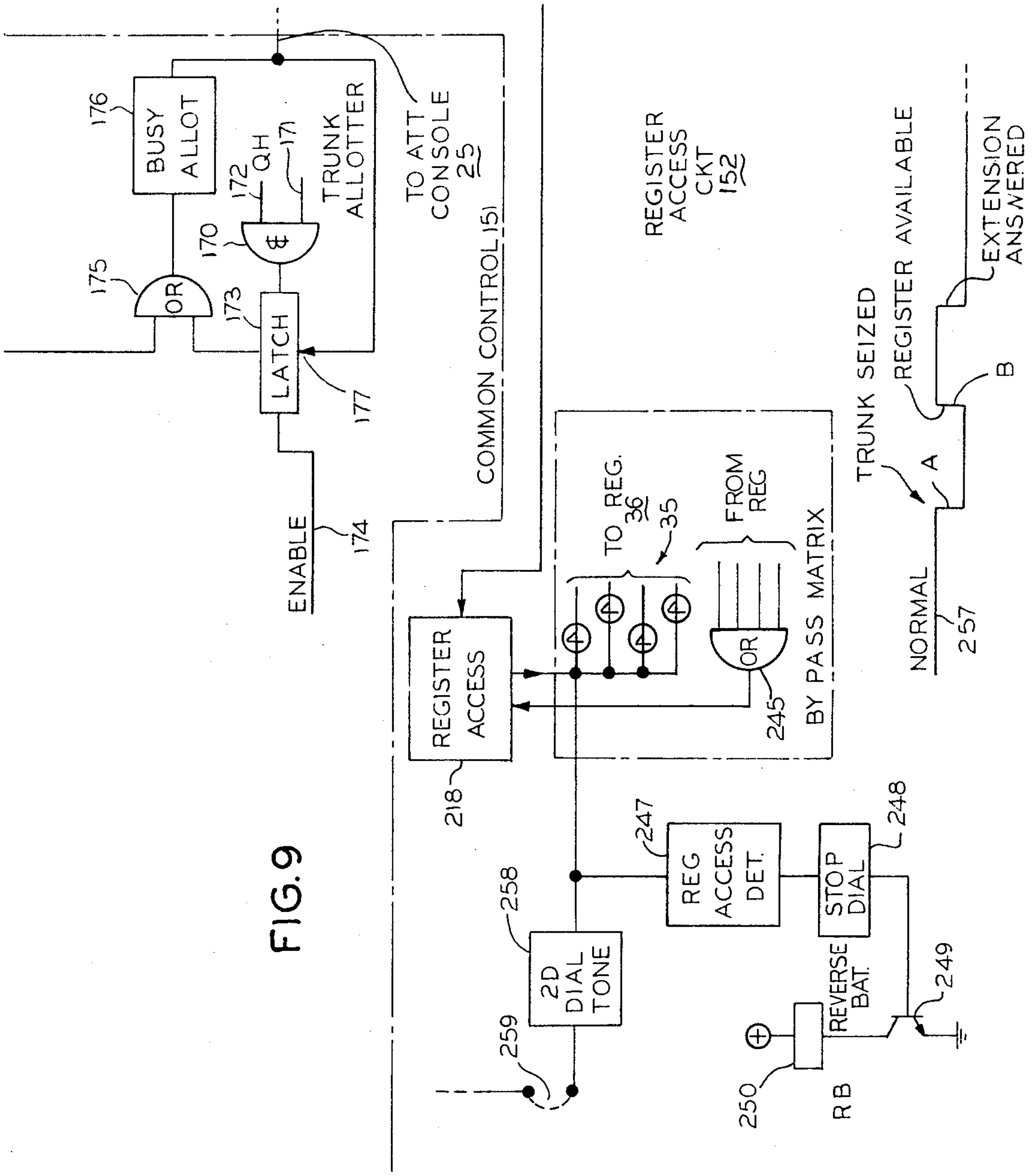

When a trunk call is detected, the general purpose junctor causes a transfer of the switch path from itself to the DID trunk circuit 24 during the system allotter time period while the trunk circuits are enabled by the level marking on lead 172 (upper right of FIG. 9). If no path is completed, the system drops back until the next system allotter time pulse occurs, when lead 172 is again marked.

When the path is completed to an off-hook line, the voltage at the point Y1 is between −3 and +3 volts, and both of the detectors 185, 186 give an output signal. Responsive to the output of the −3 volt detector 186, a dial pulse filter 198 switches on a transistor 200, via gate 201, to operate a line relay (L) 202. The line relay contacts 203 (right side of FIG. 10) close preparatory to a closure of the loop across the trunk line conductors 33, as a seizure signal to the distant office. The loop closure is completed when the outgoing relay (OTG) 204 operates.

After an interval of time (such as 180 milliseconds) a "C-delay" timer 205 gives a signal, enables speech gates 194, 195 via inhibit gate 217, and a transistor 206 turns on.

When the local and city speech gates 194, 195 are enabled, the voice path from the point Y1 at the quaternary side (OH) of the network is extended to an appropriate outgoing voice circuit access point 154, selected by a selective operation of contacts 155. When the speech gate 195 turns on, a transistor 196 turns off to remove an idle line termination 197 from the line. If a multi-frequency dial is used, signals may be fed through these gates to the distant office via the trunk line 33.

A "C-delay" relay 207 (FIG. 8) operates to open contacts 208, 209 (FIG. 10) and remove the resistive shunt SH normally connected across the secondary windings of the transformer TR. Also, when the C timer 205 (FIG. 8) gives an output signal, the outgoing relay 204 is operated via gate 210 and transistor 211. Incoming relay 212 (FIG. 10) does not operate during an outgoing call. If the call were incoming, the incoming relay 212 would have previously operated contacts 213 (FIG. 8) to inhibit the gate 210 and thereby prevent operation of outgoing relay 204. At contacts 214, 215 (FIG. 10), the outgoing relay 204 disconnects the tip and ring line conductors T, R from incoming relay 212 and connects the line T, R to the reverse battery supervision relay (RBS) 216, to enable the distant office to detect an answer supervision. Also, a resistive termination TRM and pulse repeating contacts 203 are connected across the trunk line conductors T, R, thus completing the circuit for seizing and signaling the distant office. Finally, contacts on the OTG relay 204 (not shown) may inhibit any incoming logic and enable any outgoing logic, as required.

The DID trunk circuit causes a register access circuit 218 (FIG. 9) to call in a register 36, if the circuit is arranged to require one to be associated with the trunk at this time. Otherwise, the trunk circuit is arranged to be operated by digits stored in the originating register when the call was first extended to a general purpose junctor 28 (FIG. 1). In this case, the access circuit 218 may cause the original register to be connected directly to the DID trunk circuit via a transfer path in the bypass matrix 35. Or, a final option is to have the contents of the original register transferred to the DID trunk circuit, as a routine part of a regular call.

The distant office returns dial tone or a start dialing signal when it is ready to receive digital signals for controlling any suitable switching equipment at the distant office. It is here assumed that these signals are the conventional open loop dial pulses. If they are the multifrequency tones of a pushbutton dial, such tones are merely forwarded over the voice path represented by the heavily inked line to suitable receiving and decoding equipment.

Each dial pulse appears as a brief on-hook signal which turns off the detector 186, (detector 185 holds because the switch path is completed). However, the dial pulse does not persist long enough to allow either the "B-delay" timer 188 or the transfer timer 191 to time out. Since neither of the timers 188, 191 times out, the constant current circuit 190 continues to supply tne network path with holding current.

Responsive to the first dial pulse, the "C-delay" timer 205 turns off to inhibit gates 217, 194, 195, to de-energize the transistor 206, and release the "C-delay" relay 207. This relay release closes the contacts 208, 209 (FIG. 10) to place the shunt resistors SH across the secondary windings of the transformer TR, thereby improving the loop pulsing characteristics on tip and ring conductors T, R of the trunk line 33 . At the end of each dial pulse, the "C-delay" timer 205 begins to measure a 180-millisecond period during which another dial pulse may appear and reset the timer. Thus, the speech gates 194, 195 are turned off and the relay 207 remains released throughout an entire dial pulse train. After the last dial pulse has disappeared, the timer 205 is not so reset. A time period of 180-milliseconds elapses, speech gates 194, 195 turn on, transistor 206 again turns on, and the "C-delay" relay 207 reoperates. This re-opens the contacts 208, 209 to remove the shunt resistors SH, and return the transformer to the voice path.

Responsive to each dial pulse, the pulse filter 198 turns off and then on again. The transistor 200 (FIG. 8) also turns off and then on. This releases and reoperates the line relay 202. Each time that relay 202 releases and reoperates, the contacts 203 (FIG. 10) open and close to send a dial pulse to the distant office. In this manner, the locally generated dial pulses are repeated over loop 33 to the distant office. Suitable pulse correction and spark protection circuits (not shown) may be provided where ever required. Also, if other access points 154 are used, well known circuits may be provided to give E and M or any other known forms of signals, as required by the distant office. Toll restrictor means are effective during an interval while the digital signals are being received, and the call is released if an attempt is made to complete a forbidden call via said trunk circuit. More particularly, the toll restriction is provided responsive to the appearance of a preselected dial pulse train (e.g., the second digit). A toll restrictor 220 (FIG. 8) counts the dial pulses as they are received. After the monitored digits are completed, the contacts 221, 222, 224 open in any suitable manner (not shown) to dismiss the toll restrictor 220. If the number of counted pulses coincides with an internal strapping in the toll restrictor 220, it inhibits gate 201 to turn off the transistor 200, release line relay 202, open contacts 203 (FIG. 10), and break the loop to release the distant office. The busy tone gate 223 is energized, and busy tone is returned to the calling subscriber. For example, the toll restrictor 220 may so operate if the second digit is a "1" or a "0," thus indicating that an area code has been dialed.

When the called subscriber answers at the distant exchange, equipment thereat reverses the battery connections to the tip and ring leads T and R in the usual manner. As the direction of current flow reverses, the diode 225 (FIG. 10) conducts, and reverses battery supervision relay 216 operates. This closes the contacts 226 (FIG. 8) to energize the message register 227 for billing or any other desired purposes. Over point Y1, the message register 227 returns a 100-millisecond pulse measured by a timer 228 to trip a billing device associated with a calling station line circuit. On local calls, perhaps this single metering pulse is all that is required. On toll calls any suitable number or type of timing pulses may be counted as they are received over wire 229 to measure the duration of a call. Periodically, then, the message register 227 returns a billing pulse.

Figure 10:
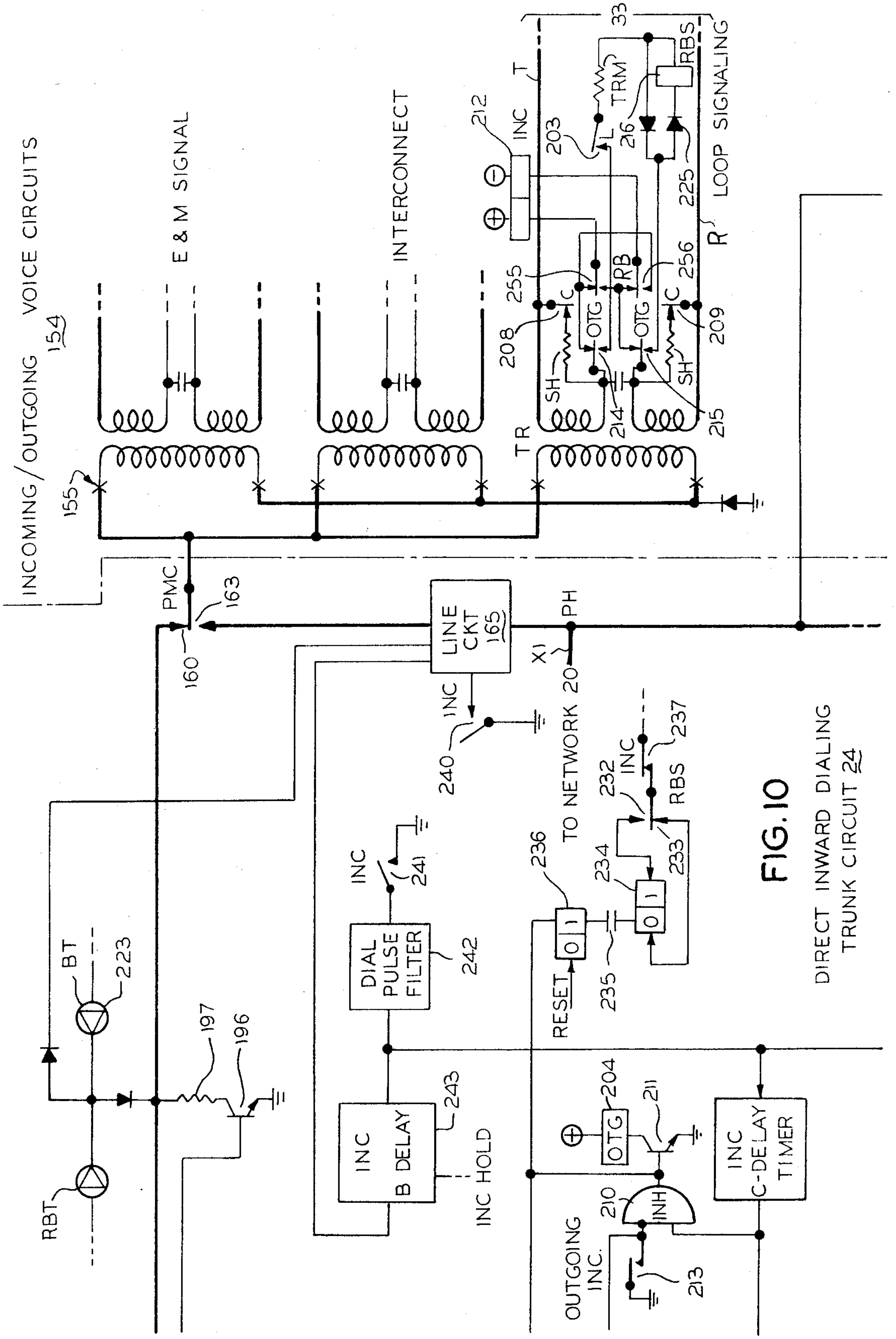

If the local station releases first, the −3 volt detector 186 switches off, the transistor 200 turns off, releasing line relay 202 and opening loop contacts 203 (FIG. 10). The distant office releases when the loop 33 is thus broken. After 2 seconds, the "B-delay" circuit 188 (FIG. 8) turns off, and after ten seconds the transfer detector 191 turns off. The constant current circuit 190 turns off and the switch path is released in network 20.

The "C-delay" timer circuit 205 turns off the transistors 206, 211, releasing the relays 207, 204 (if operated). Relay 207 closes contacts 208, 209 (FIG. 10) to connect the shunt resistors SH across the secondary windings of the transformer TR. Relay 204 restores contacts 214, 215 to reconnect incoming relay 212 to the trunk line 33. Finally, the "C-delay" timer 205 turns off the speech gates 194, 195. Responsive thereto, the transistor 196 (FIG. 10) turns on to connect an idle termination resistor 197 to the line.

Means are provided to prevent the calling party from placing a new call after the called party hangs up, unless the calling party first hangs up to recall the toll restrictor. More particularly, when the reverse battery relay 216 (FIG. 10) operates responsive to a called party answer, contacts 232 close to set a flip-flop 234 to its "1" side. When the called party hangs up, reverse battery relay 216 releases to reset the flip-flop 234 to its "0" side. The leading edge of the output from the "0" side of the flip-flop 234 sets a latch circuit 236 to its "1" side. The latch circuit inhibits gate 217, 194, 195 and holds transistors 200, 211 in a switched on condition to prevent release of relays 202, 204. Thus, contacts 203 cannot open, the multifrequency path through gates 194, 195 is closed, and no dial pulses may be sent to the distant office. The latch 236 resets to its "0" side when the calling party releases. On incoming calls, the incoming relay 212 opens contacts 237 to remove this latch circuit. Other logic circuitry (not shown) may also remove this latch circuit whenever this feature is not desired.

After the transfer timer 191 times out, the constant current circuit 190 turns off to release the switch path terminated at point Y1. The trunk circuit (FIGS. 8–11) returns to normal and is ready for the next call.

Means are provided for transferring a connection responsive to a transfer signal. More particularly, to enable a transfer, the timer 191 measures a period of time which is longer than a dial pulse, but shorter than a full release (a little more than ten seconds). To request a transfer, the subscriber connected via network access point Y1 flashes his hook switch which usually requires about ten seconds. During the period while the hook switch is open and after a normal dial pulse would have terminated, the transfer timer 191 energizes the constant current circuit 190 to supply a holding current to the network path, and timer 191 holds a latching signal on the transistors 200, 211 to prevent release of the relays 202, 204. A transfer features circuit recognizes the ten second hook signal flash as a request to transfer and proceeds to complete the requested transfer function. If the subscriber sends a hook switch signal which is too long for transfer and then does not hang up, but merely holds, the inhibit gate 193 and OR gate 192 drive the trunk circuit through a complete rest cycle.

When the hook switch contacts first open on the transfer flash, the "C-delay" timer 205 switches off, as it does on dial pulses. This removes the driving current from gate 217 which switches off to turn off the speech gates 194, 195. The transfer feature circuit supplies an inhibit signal to gate 217 to hold the speech gates in their turned off condition and to lock the line and outgoing relays 202, 204 in an operated condition. This maintains the loop to the distant exchange to hold the switching equipment thereat. Thus, locally dialed pulses can have no effect in the distant office because, in the described condition, the line relay 202 is locked to prevent transmission of dial pulses, and speech gates 194, 195 are turned off to prevent transmission of multifrequency signals over trunk line 33. This prevents both spurious signals to the distant office and possibly fraudulent calls after the toll restrictor 220 has been dismissed.

INCOMING CALLS

Figure 11:
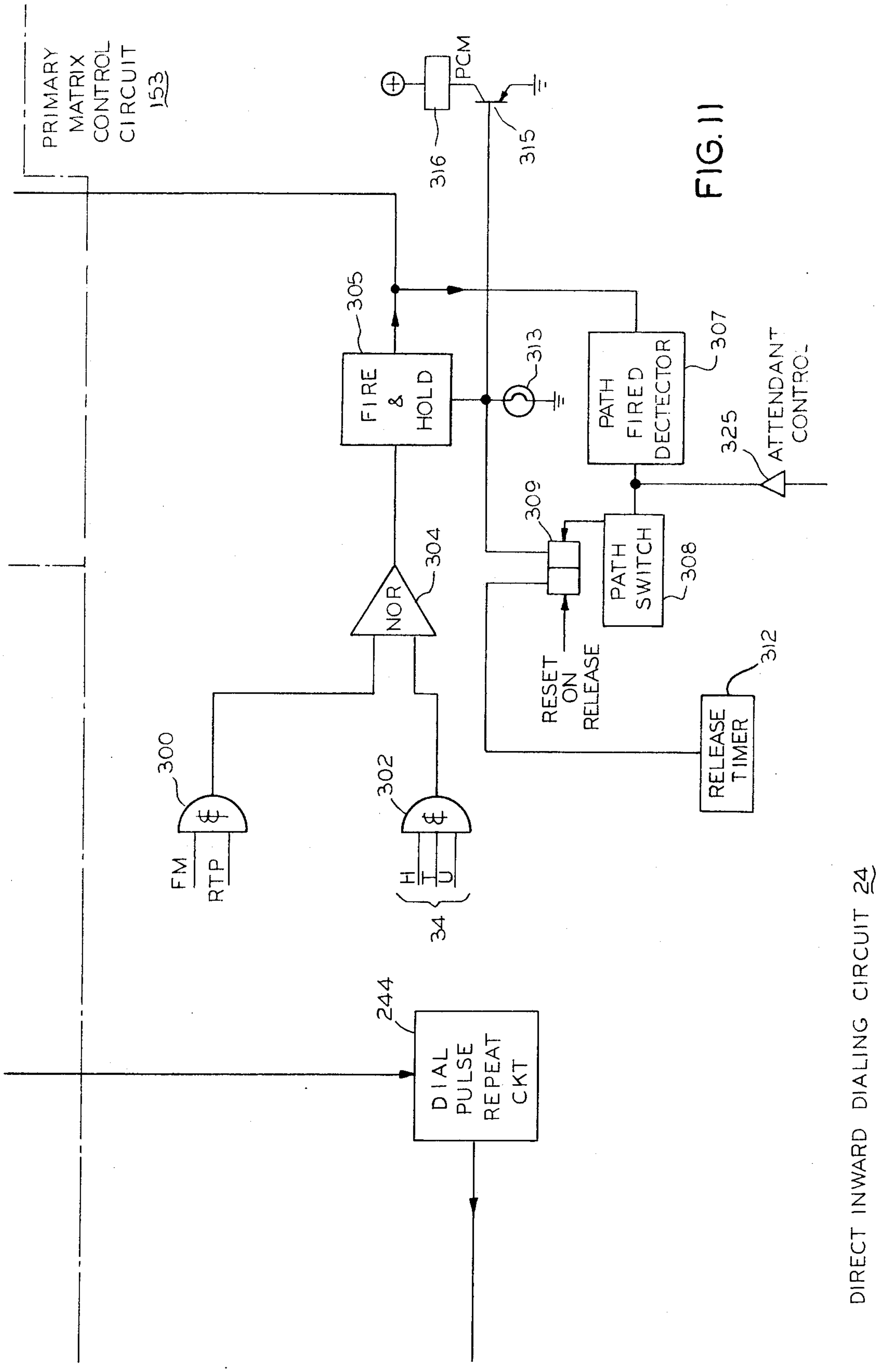

The next call to be described is one which is incoming from the distant office. Again, the call may come in on any kind of a trunk, such as from an E and M signaling trunk line, from an interconnect circuit (a foreign attachment), or from a loop signaling trunk 33. Again, the loop signaling trunk is described by way of example. The incoming call is serviced under the control of the primary matrix control circuit 153 (FIG. 11).

Briefly, the primary matrix control circuit 153 (FIG. 11) operates this way. An incoming call reaches the DID trunk circuit 24 via the trunk line 33 (FIG. 10). Then the DID circuit 24 seizes a register via a by-pass matrix 35 (FIG. 1). The register may also return a second dial tone if the system is so equipped. Either the calling subscriber may dial "9"; or, a register in the distant office sends the digits, as required. The system performs its usual functions and detects the need for a "features" service to perform a primary matrix control.

In greater detail, the distant office places a loop across the tip and ring conductors T and R, of trunk line 33, as a seizure signal. Incoming relay 212 (FIG. 10) operates over a circuit traced from the battery connected through its windings, normal contacts 255, 256 on the reverse battery relay, normal contacts 214, 215 on the outgoing relay 204 (not operated on on incoming calls), the shunt resistors SH, and contacts 208, 209 in parallel with the secondary windings on the transformer TR to tip and ring conductors T and R. The line relay contacts 203, resistive termination TRM, and reverse battery supervision relay 216 play no part in this call; therefore, they are disconnected at the normally open contacts 214, 215.

When the incoming relay 212 operates, its contacts 213 close to inhibit gate 210 and prevent any operation of the outgoing relay 204, and to energize the "C-delay" timer 205 and relay 207 for controlling the shunt contacts 208, 209. Incoming relay contacts 240 also close to cause the line circuit equipment 165 in the DID trunk circuit to place a demand upon the local electronic switchboard, by applying an end marking to the PH matrix access point X1, at an appropriate time, later during the call. The contacts 241 close to energize the incoming pulse filter 242. Responsive thereto, an incoming "B-delay" circuit 243 is energized to hold the system during interpulse time periods.

Means are provided for directly associating a register with the trunk circuit to receive dial pulses transmitted from a distant office calling subscriber over the trunk line to the DID trunk circuit. More particularly, the output of the dial pulse filter 242 is also extended through a dial pulse repeat circuit 244 to a register access circuit 218 and the bypass matrix 35 where paths are completed through PNPN diodes to and from an idle register 36. This path may be set in any desired manner, either by preallotment or by firing a diode on demand. The OR gate 245 enables the access circuit 218 when any register is idle or available to serve this call.

Also, responsive to the output of the dial pulse repeat circuit 244, a register access detector 247 is energized to selectively control a stop dial circuit 248, as required. If no register is available, the stop dial circuit 248 switches on a transistor 249 and, in turn, a reverse battery relay 250 operates. This relay operates its contacts 255, 256 (FIG. 10) to send reverse battery supervision over the trunk line conductors T, R, as shown at 257A (FIG. 9). The equipment in the distant exchange is thus informed that the local switchboard has responded by seizing the trunk carrying the incoming call, and that it should wait for a register assignment.

As soon as the register attaches itself, via matrix 35, to serve this particular call, a signal is returned through bypass matrix 35 to stop dial circuit 248. The transistor 249 turns off to release contacts 255, 256 and restore the direction of current flow to normal, as shown at 257B. This reverse of current informs equipment in the distant office that the register is now available. Also, the register signal may cause a second dial tone (the first dial tone occurred in the distant office) to be sent from a tone generator 258 to the calling subscriber via strapping 259, if provided. In any event, dial pulses are sent from the distant office to this local office in response to either the second dial tone or to the second reverse battery signal 257B.

Each incoming dial pulse is an open loop period during which the incoming relay 212 releases, and then reoperates. The "C-delay" circuit 205 and relay 207 close contacts 208, 209 to shunt the voice coils and improve pulse transmission characteristics. Each release of relay 212 opens the contacts 241 to repeat a dial pulse into the pulse filter circuit 242. The "B-delay" circuit 243 holds the various circuits in an operated condition during dial pulsing. The circuit 244 repeats the dial pulse into the register via operated diodes in the bypass matrix 35.

The system allotter 27 generates a feature mark pulse FM as it goes through its cycle, which indicates that the DID trunk circuit may operate. Also the register 36 generates a terminate pulse RTP when it is ready to perform a function indicated by the stored digits. These two pulses coincide at the input of an AND gate 300 (FIG. 11) which conducts to indicate that the call may proceed also during the hundreds, tens and units time slot assigned to this particular trunk circuit, when the AND gate 302 conducts. Responsive jointly to the outputs of the gates 300, 302, a NOR gate 304 causes a primary matrix end marking to be applied from a fire and hold circuit 305 to the primary side of network 20, at the end point X1 of the network.

At the end of the features mark pulse FM and the hundreds, tens, and units, mark the AND gates 300, 302 turn off but the hold circuit 305 supplies a holding current to point X1 which latches the path, if it was completed. If it was not completed, the system stands in the described condition until the next appearance of a features mark pulse FM, and the proper hundreds, tens, and units pulses when it tries again.

Assuming that the path is latched, a path fired detector 307 switches states to give an output pulse and operate a path switch 308. The flip-flop 309 is set to latch the holding circuit 305 for insuring the continuous supply of holding current to the path for the duration of the call. Also a release timer 312 turns off. If the path had not been properly completed before the timer 312 times out, the system abandons its attempts to complete the call, and it gives a busy tone to the calling subscriber.

An attendant lamp 313 is lit to indicate the busy status of the trunk under the control of the flip-flop 309. This lamp 313 may also light in a bright or dim, and in a steady or flashing condition, to give added information concerning the various network path conditions.

Means are provided whereby the trunk line is connected through the trunk circuit to the primary side of the network via a transfer means in the form of contacts 163. It may be recalled that the transfer means is normally operated to extend an outgoing call from said output side of the network to the trunk line. More particularly, responsive to the operation of the flip-flop 309, a transistor 315 turns on to operate a primary matrix control relay 316. This closes the transfer contacts 163 and enables the transmission of speech and other signals over the heavily inked line from network point X1 to the trunk 33.

Means are provided for completing an incoming tandem call from one trunk line to the atendant's position or console from which the attendant may control the network to further extend the call through the calling trunk circuit via an output terminal on the network, a path through the network, and an input terminal on the network to the DID trunk circuit and an outgoing trunk line. These tandem calls occur, as shown in FIG. 7. A call comes in over wires 33' to any suitable trunk circuit 32, and then the system switches it to the attendant position 25. The attendant talks to the calling party and learns that a DID trunk circuit 24 is required in order to complete a circuit over the trunk line 33.

To establish the tandem call, the attendant dials a directory number assigned to DID trunk circuits. Responsive thereto, the directory number AND circuit 302 (FIG. 11) conducts. The system operates responsive to signals from the attendant console 25 to cause the trunk circuit 32 (FIG. 7) to mark the network access point Y3 at the same time that the fire and hold circuit 305 (FIG. 11) of the DID trunk circuit 24 marks the point X1. A path fires through the network 20 (as shown in FIG. 7). Thus, the circuit establishes a path from point Y3 at the OH side of the trunk circuit 32 (FIG. 7) to the point X1 at the PH side of the DID trunk circuit 24, as shown in FIG. 7.

The tandem switching function occurs during the attendant's time slot — not during the DID enable time slot. Thus, the feature mark pulse FM does not appear, and the AND circuit 300 does not produce a signal. There is no way to control the path switch 308 from a subscriber line except when the control is carried out in a normal manner while the DID trunk circuit feature mark pulse FM is present. Thus, during tandem calls, a special attendant controlled gate 325 is used to operate the path switch 308 and thereby fire a path through the network.

To send dial pulses, the operator dials in a normal manner, and causes the switches to be set in the distant office in a normal manner.

It is to be understood that the foregoing description of a specific example of the invention is not to be considered as a limitation on its scope.

We claim:

1. A trunk circuit for use in a telephone switching system including an electronic exchange and at least one other exchange, and in which the electronic exchange includes an electronic switching matrix having a line side and a link side, each side of said matrix coupled to a source of different potential, and in which the matrix is responsive to marking on both of its sides to complete a switching path therethrough, said trunk circuit having an appearance for access from the line side of said matrix for completing calls to said electronic exchange, and having an appearance for access from the link side of the matrix for transmitting calls from said electronic exchange, potential detecting means in said trunk circuit for sensing which side of said matrix the trunk circuit is accessed from, and means responsive to accessing of said trunk circuit from either direction for connecting a digital signal register to said trunk circuit to receive and store digital signals received by said trunk circuit for aiding in the completion of a call through said trunk circuit.

2. The trunk circuit of claim 1 and restrictor means associated with said trunk circuit during an interval while said digital signals are being received, means in said restrictor means operated responsive to said signals for detecting calls which are forbidden to be completed via said trunk circuit, means responsive to the completion of the digital signals for dismissing said restrictor means from said call, and means for thereafter precluding a second response to further digital signals transmitted during said call after said restrictor means is dismissed.

3. The trunk circuit of claim 2 being connected to a trunkline to said other exchange and including means responsive to the detection of a forbidden call by said restrictor means for releasing the trunk line.

4. The trunk circuit of claim 2 and transfer means for detecting a transfer signal, means responsive to said transfer signal for transferring a connection in said network responsive to digital signals received after said transfer signal, and means for precluding further response to dial signals occurring after said restrictor means are dismissed if no valid transfer signal is received prior to said dial signals.

5. The trunk circuit of claim 2 and means for monitoring access points to said network for false signals of newly initiated calls when power appears on a path through said network, and automatic power reset means for driving said trunk circuit through a reset cycle responsive to the detection of said false signal.

6. The trunk circuit of claim 5 and timing delay means for delaying the release of said trunk circuit for a period which is long enough for the occurrence of all normal signalling without causing said trunk circuit to release, the monitoring means comprising means operative responsive to the condition of said timing delay means when said power appears on said path, said monitoring means releasing said trunk circuit if said apparently newly initiated call occurs after said period for said delayed release has expired.

7. The trunk circuit of claim 3 wherein there are means whereby said trunk line is connected into said trunk circuit via a transfer means, said transfer means being normally operated to extend an outgoing call from the link side of said network to said trunk line, and means responsive to an incoming call on said trunk line for operating said transfer means to connect said trunk line to the line side of said network.

8. The trunk circuit of claim 7 and means for rejecting all release signals received over said trunk line from said other exchange during a predetermined time period immediately following the transmission of a seizure signal to said other exchange.

9. The trunk circuit of claim 1 and means comprising a bypass matrix for connecting said trunk circuit directly to a transfer junctor, register means permanently associated with said transfer junctor, and means responsive to digital signals sent from said trunk circuit through said bypass matrix to said transfer junctor register for causing said network to make a new connection from said trunk circuit to a line identified by said digital signals.

10. The trunk circuit of claim 3, and a plurality of general purpose trunk lines, and a plurality of direct inward dialling trunk lines, means for normally preassigning one of said general purpose trunk lines to serve the next general purpose trunk call, means for normally reserving said direct inward dialling trunk lines for that particular type of call, and means responsive to high traffic conditions for pre-assigning said direct inward dialling trunk lines to serve said general purpose calls.

11. The trunk circuit of claim 1, and means for measuring a predetermined period of time after an incoming call is received at said trunk circuit, means responsive to answer by a called party for cancelling the measuring by said measuring means, and means for signalling an attendant position if the called subscriber does not answer before the time measuring means times out.

12. The trunk circuit of claim 1, and means for detecting calls which cannot be completed on a direct inward dialling basis, and means responsive to the detection of such a call for making a voice connection directly from said trunk circuit to an attendant position or voice recorder.

13. The trunk circuit of claim 3, and means for extending a connection from a first trunk line serving an incoming call from an output terminal of said network to a second trunk line connected to an input trunk terminal of said network.

14. The trunk circuit of claim 1, and means for monitoring a calling line to determine the class of service given to it, and means responsive to said monitoring means for selectively restricting certain calls.

15. In a telephone system, a first office comprising an electronic switching network of the type which responds to points at the opposed ends of the network being marked for completing a path between the marked points and in which the ends of said network are a line end and a supervisory end, the invention comprising a trunk circuit having connection to a point on each end of said network, said trunk circuit normally disposed to be accessed from the line end of said network for use as a direct inward dialling trunk circuit, means in said trunk circuit settable to allow said trunk circuit to be accessed from the supervisory end of the network for use as an outgoing trunk circuit, means in said trunk circuit for detecting the condition of the network and the condition of a calling line whereby to cause seizure of said trunk circuit as an outgoing trunk circuit, and means responsive to detection of an incomplete path to the supervisory point to which said trunk circuit is connected for releasing the said trunk circuit from said seizure.

16. In a system as claimed in claim 15, a plurality of trunk circuits, each of said trunk circuits having connection to a point on the line end of said network and to a point on the supervisory end of said network, means responsive to seizure of a trunk circuit from the line end of said network for allotting a register thereto for storage of dialled digital signals and means responsive to completion of storage of digits for emitting a first pulse signal, an allotter for periodically producing a second pulse signal to indicate the trunk circuit is available for use, and means responsive to an occurrence of coincidence of said first and second pulse signals for latching a path through said network to the point connected to the seized trunk circuit.

* * * * *